Sept. 13, 1927.  1,642,580
I. H. ERB
HIGHWAY MAP
Filed Nov. 20, 1922   2 Sheets-Sheet 1
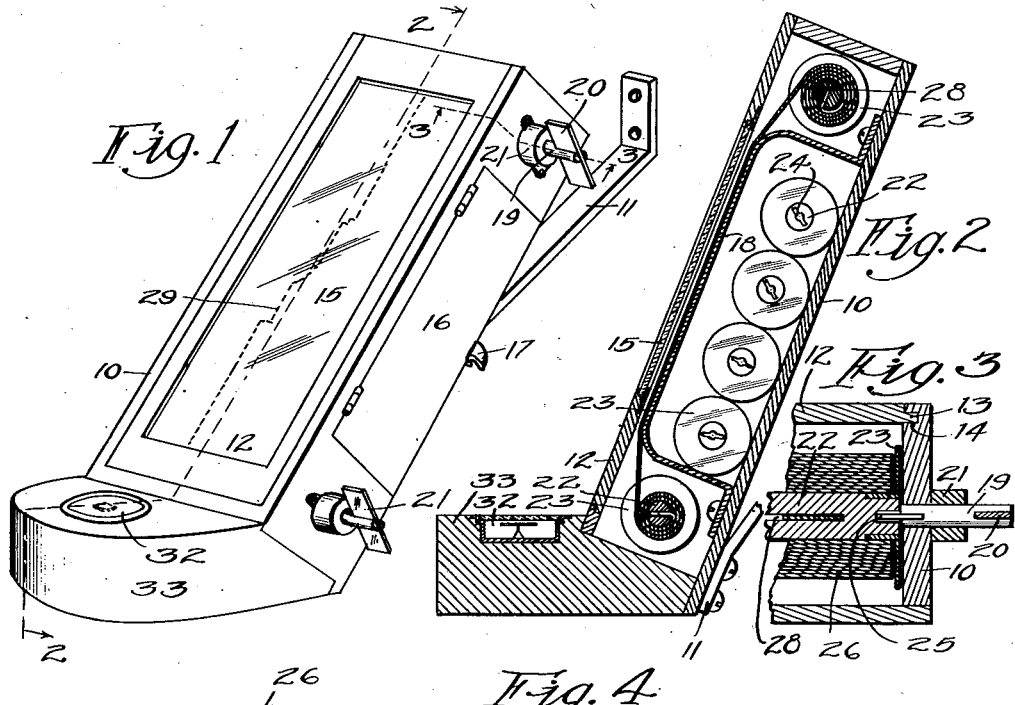
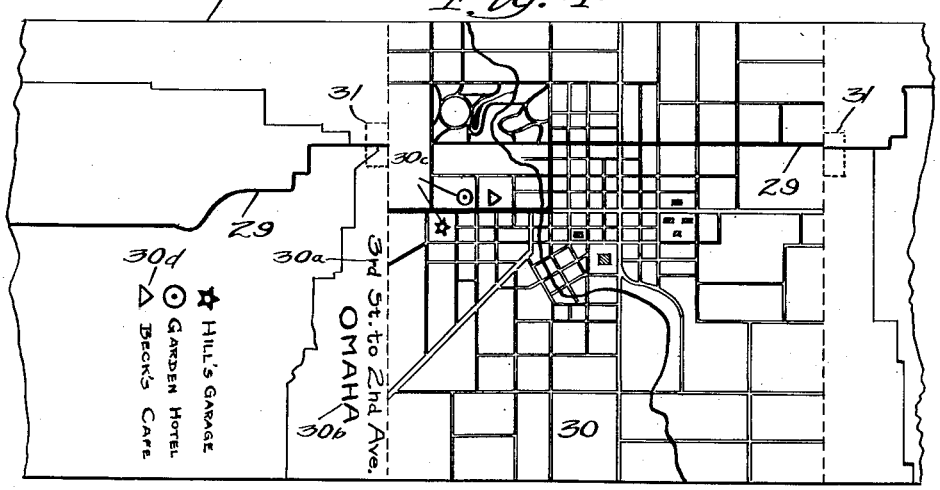
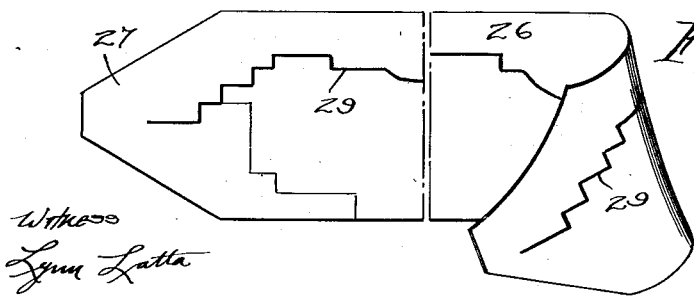
Inventor
Irwin H. Erb Sept. 13, 1927.

I. H. ERB 1,642,580

HIGHWAY MAP

Filed Nov. 20, 1922

Witness
L. F. Sandberg

Inventor
Irwin H. Erb
by Bair & Freeman
Attorneys

Patented Sept. 13, 1927.

1,642,580

UNITED STATES PATENT OFFICE.

IRWIN H. ERB, OF WEST LIBERTY, IOWA.

HIGHWAY MAP.

Application filed November 20, 1922. Serial No. 602,305.

The object of my invention is to provide a highway map of simple, durable, and comparatively inexpensive construction.

More particularly, my map is so arranged as to include any one principal highway and cities on the highway, the highway being shown on one scale relative to actual distance, and the cities being shown in a different and increased scale for more clearly marking out the route through the city.

In this connection, it may be mentioned that in travelling cross-country it is extremely difficult to pass through a city of any size and stay on the highway. Much time is lost in passing through a city, in view of the fact that the driver is unfamiliar with the city and, it is my object to so arrange the map that the city will be shown clearly and the highway passing through the city, shown thereon with such clearness that the driver will not have any trouble in following the route.

Still a further object is to arrange the map of the highway on a strip of paper or the like so that it may be rolled from one spool on to another, as desired.

Still a further object is to print the highways and cities on both sides of the strip of paper reversing them from end to end on opposite sides so that when driving in one direction, as for example, from Des Moines, Iowa, to Omaha, Nebraska, the map may be rolled from one spool to another and then by reversing the map, the end having Omaha, Nebraska, thereon will be the first to become unrolled.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a perspective view of my device.

Figure 2 is a sectional view taken on line 2—2 of Figure 1.

Figure 3 is a detail, sectional view taken on line 3—3 of Figure 2.

Figure 4 is an enlarged view of the portion of the strip of paper upon which is printed the map.

Figure 5 is a perspective view of one of the strips upon which the highway data is printed.

Figure 6:
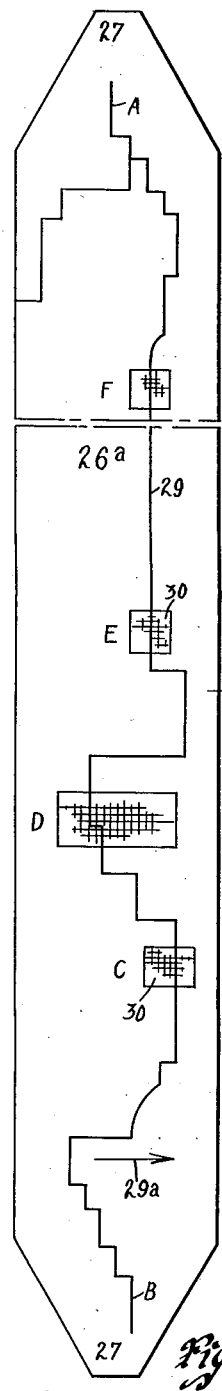
Figure 7:
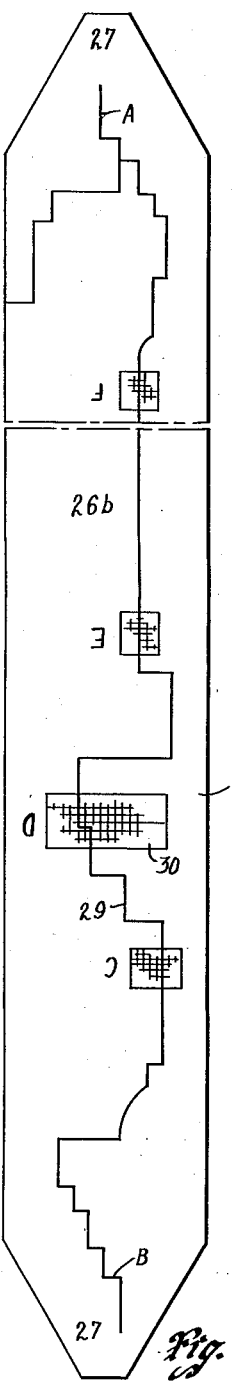
Figure 8:
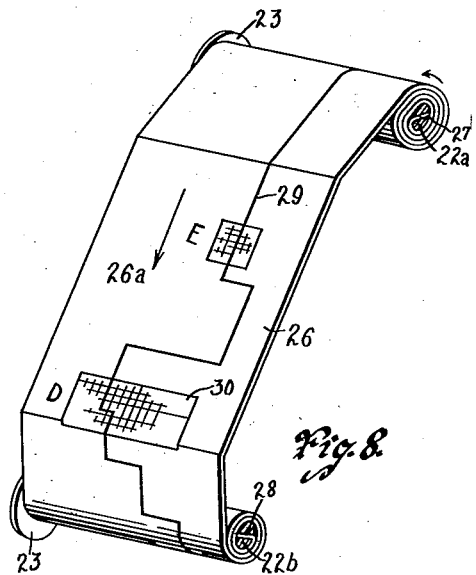
Figure 9:
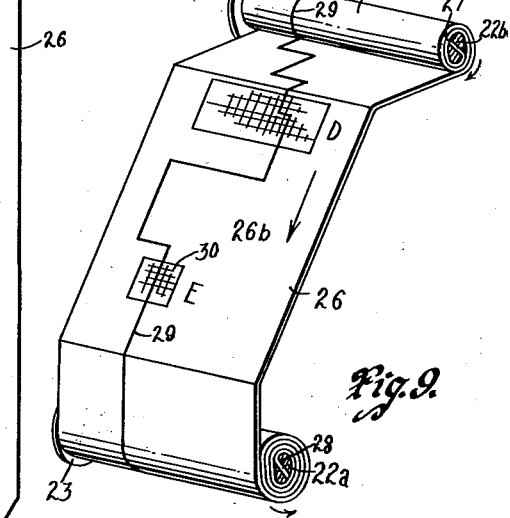

Figure 6 is a face view of said strip. Figure 7 is a face view of the opposite side of said strip after the strip shown in Figure 6 is turned side for side. Figure 8 is a perspective view of the strip showing its relative position to the spools from which, and onto which, it is being rolled; and Figure 9 is a similar view showing the strip with the reverse side exposed.

In the accompanying drawing, I have used the reference numeral 10 to indicate generally a casing, which is mounted on a bracket 11. The bracket 11 may be secured to the dash of an automobile, if so desired.

The case 10 is provided with a sliding member 12 which is arranged with tongues 13 to slide in grooves 14 formed in the side wall of the casing 10, as shown in Figure 3. The sliding member 12 is provided with a transparent member 15.

One of the side walls of the casing 10 is provided with a door 16 arranged to be held in closed position by the snap 17.

Secured to the bottom of the casing 10 and extending from side to side is a partition member 18. The partition member 18 is so arranged that only a narrow distance is provided between it and the transparent member 15.

The partition member 18 also serves as a shelf as will hereinafter more fully be brought out. The partition member 18 causes a compartment to be formed between it and the bottom of the casing 10. Access to the compartment is had through the door 16. Supply maps may be kept in the compartment. Mounted in each of the sides of the casing 10, near the top and bottom are spindles 19, which are capable of sliding in and out, as desired. The spindles 19 project out beyond the side of the casing 10 so that finger engaging members 20 may be secured thereto. The spindles 19 are mounted in bearings 21.

Spools 22 are arranged to be mounted on the spindles 19. Each of the spools 22 comprises a roller portion having side flanges 23 thereon. One end of the spools 22 is provided with a slot 24.

A member 25 is mounted on the spindle 19, which has the finger engaging element 20 thereon. The member 25 is designed to be received in the slot 24 so that the rotation of the spindle 19, just referred to, will cause the spool to be rotated. The remaining two spindles 19 merely extend into circular openings formed in the ends of the spools.

The highway maps are printed on strips 26. The strips 26 may be either paper or cloth, as desired. The ends of the strips 26 are tapered (as at 27) so that they may be received in slots 28 formed in the spools 22. The strips 26 are secured to any of the spools by inserting the end of a tongue 27 formed by the tapering of the ends of the strips, into the slot 28 in the spool 22.

When it is desired to mount a strip 26 on any of the spools, it is necessary to remove the sliding member 12 and after the strip has been secured to the spools 22, then the spools 22 are placed in position and a portion of the strip 26 will appear below the transparent member 15 when the slide has been returned to its place.

I have referred to the main highway shown on the strip by the reference numeral 29. The highway 29, between the cities, is shown in one proportion relative to actual distance while the city referred to by the reference numeral 30, is in a different and increased scale.

In this connection I have labeled the corresponding ends of the highway A and B (Figures 5, 6, and 7). In Figures 6, 7, 8, and 9 of the drawings I have indicated the names of corresponding cities 30 as C, D, E and F.

Inside the city, the highway is marked by a heavy or a colored line, so that it may be easily followed. At the edge of the enlarged portion of the map, there are printed directions 30$^a$ which tell the names of the streets over which the highway is laid through the city. The name of the city is printed as at 30$^b$. Inside the city suitable characters 30$^c$ may be used to indicate the location of hotels or the like and on the blank portion of the map the characters may be printed and labeled, as at 30$^d$.

In this connection, it may be mentioned that it is quite difficult to follow a highway through a city on any small map, but arranging the city part of my map in enlarged proportions makes it possible to easily follow the highway. The city part of the map, in the same proportion as the highway 29, is shown by the dotted lines 31. In this way the driver of an automobile gets the general layout of the city well in mind and can easily pass through a city.

The data on one side of a strip 26 is identical with that on the other side with the exception that the printed data is reversed relative to the highway as clearly illustrated in Figures 6 and 7 of the drawings. It may here be noted that Figure 7 is a view of the reverse side of the strip shown in Figure 6 when the strip is turned side for side as indicated by the arrow 29$^a$. The two faces of the strip are indicated by the reference numerals 26$^a$ and 26$^b$, so that after the map has been used for a trip, for example, from Des Moines to Omaha, it can be turned over and is ready for use as a guide from Omaha to Des Moines.

It will be noted by referring to Figures 6 and 7 of the drawings that the same portion of a highway is shown on both sides of the strip 26 but the data, as for instance, the names of the cities 30 indicated by the characters C, D, E and F is reversed or upside-down on the side 26$^b$ of the strip 26 with respect to the characters on the side 26$^a$ of the strip.

The natural direction of running the map is downward. This is accomplished by winding the map from the upper spool 22$^a$ onto the lower spool 22$^b$, with the desired side, as for instance, the side 26$^a$ exposed as illustrated in Figure 8 of the drawings. The map is wound in this manner by turning the lower finger engaging element 20. When returning over the same route, the spools 22$^a$ and 22$^b$ are exchanged on the upper and lower spindles 19 with the strip 26$^b$ being rolled from the under side of the spool 22$^b$ (see Figure 9) instead of from the upper side of the upper spool as in Figure 8 whereby the side 26$^b$ of the strip is exposed to view through the transparent member 15 with the highway 29 running in the opposite direction. When the parts are in this position, the characters C, D, E and F on the side 26$^b$ of the strip will read right side up.

A compass 32 may be mounted in a block 33 which can be secured to the lower end of the casing 10. It will be understood that the device can be used with or without a compass, as desired.

It will be understood that my map can be used for aeroplane routes as well as auto routes.

Some changes may be made in the general layout of my map and device, but it is my intention to cover by my claim, any reasonable changes which may be made.

I claim as my invention:

A highway map comprising a strip of material adapted to be wound from one spool to another, data on one side of said strip relative to a highway and data on the other side relative to the same highway, printed data on each side thereof, the printed data on one side being reversed relative to the printed data on the other side whereby the map may be wound from one spool to the other with one side exposed to view when following the highway in one direction and the map may be wound back onto the first spool with the opposite side exposed when following the highway in the opposite direction.

Des Moines, Iowa, October 24, 1922.

IRWIN H. ERB.